United States Patent
Nainar et al.

(10) Patent No.: US 11,082,540 B2
(45) Date of Patent: Aug. 3, 2021

(54) NETWORK OPERATIONS INCLUDING PROTOCOL PROCESSING OF A PACKET UPDATING AN OPERATIONS DATA FIELD OF A DIFFERENT PROTOCOL

(71) Applicant: Cisco Technology, Inc., San Jose, CA (US)

(72) Inventors: Nagendra Kumar Nainar, Morrisville, NC (US); Carlos M. Pignataro, Cary, NC (US); Frank Brockners, Cologne (DE); Shwetha Subray Bhandari, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 27 days.

(21) Appl. No.: 16/231,301

(22) Filed: Dec. 21, 2018

(65) Prior Publication Data
US 2020/0145518 A1 May 7, 2020

(30) Foreign Application Priority Data

Nov. 5, 2018 (IN) .............................. 201841041776

(51) Int. Cl.
*G06F 15/16* (2006.01)
*H04L 29/06* (2006.01)
(Continued)

(52) U.S. Cl.
CPC .......... *H04L 69/18* (2013.01); *H04L 12/4641* (2013.01); *H04L 45/586* (2013.01); *H04L 69/22* (2013.01)

(58) Field of Classification Search
CPC ..... H04L 69/18; H04L 69/22; H04L 12/4641; H04L 45/586
(Continued)

(56) References Cited

U.S. PATENT DOCUMENTS 6,157,955 A * 12/2000 Narad .................... H04L 45/16
709/228
6,356,951 B1 * 3/2002 Gentry, Jr. ............. H04L 69/22
709/217
(Continued)

OTHER PUBLICATIONS

Deering et al., "Internet Protocol, Version 6 (IPv6) Specification," Dec. 1998, RFC 2460, The Internet Society, Reston, VA, USA (thirty-nine pages).
(Continued)

*Primary Examiner* — Thu Ha T Nguyen
(74) *Attorney, Agent, or Firm* — The Law Office of Kirk D. Williams (57) ABSTRACT

In one embodiment, network operations are improved by performing updating operations data in an operations data field associated with the header of a particular protocol during the processing of a different protocol. A particular multiple-protocol (MP) packet is received by a particular network node in a network. The particular MP packet includes multiple protocol headers, including a first protocol header associated with a first protocol and a second protocol header associated with a second protocol. Further, the second protocol header associated with a second operations data field. During protocol processing of the first protocol on the particular MP packet, the second operations data field updated with particular operations data. The particular MP packet is sent from the particular network node, with said sent particular MP packet including said updated second operations data field with particular operations data.

23 Claims, 6 Drawing Sheets

(51) Int. Cl.
   *H04L 12/713* (2013.01)
   *H04L 12/46* (2006.01)
(58) Field of Classification Search
   USPC .................................................. 709/230, 231
   See application file for complete search history.

(56) References Cited

U.S. PATENT DOCUMENTS

| | | | | |
|---|---|---|---|---|
| 6,389,468 | B1* | 5/2002 | Muller | H04L 67/1002 709/226 |
| 6,453,360 | B1* | 9/2002 | Muller | H04L 29/06 370/235 |
| 6,483,804 | B1* | 11/2002 | Muller | H04L 49/602 370/230 |
| 6,606,301 | B1* | 8/2003 | Muller | H04L 47/10 370/230 |
| 6,650,640 | B1* | 11/2003 | Muller | H04L 49/602 370/392 |
| 7,039,663 | B1* | 5/2006 | Federwisch | G06F 11/1451 |
| 7,478,101 | B1* | 1/2009 | Manley | G06F 11/1451 |
| 7,814,218 | B1* | 10/2010 | Knee | H04L 69/18 709/230 |
| 7,941,549 | B2* | 5/2011 | Ranjan | H04L 63/0869 709/228 |
| 8,315,261 | B2* | 11/2012 | Delaney | H04L 45/00 370/395.5 |
| 8,861,545 | B2* | 10/2014 | Liaw | H04L 49/3009 370/466 |
| 10,833,975 | B2 | 11/2020 | Pignataro et al. | |
| 2003/0156548 | A1 | 8/2003 | Sapp | |
| 2003/0182322 | A1* | 9/2003 | Manley | G06F 16/184 |
| 2004/0165588 | A1* | 8/2004 | Pandya | H04L 63/0272 370/389 |
| 2009/0201935 | A1* | 8/2009 | Hass | H04L 45/7453 370/395.32 |
| 2013/0034032 | A1* | 2/2013 | Vare | H04N 21/2362 370/310 |
| 2013/0039278 | A1* | 2/2013 | Bouazizi | H04L 65/4076 370/328 |
| 2014/0328204 | A1* | 11/2014 | Klotsche | H04L 45/54 370/252 |
| 2015/0081726 | A1* | 3/2015 | Izenberg | H04L 69/02 707/755 |
| 2015/0124622 | A1* | 5/2015 | Kovvali | H04L 67/1006 370/236 |
| 2015/0124704 | A1* | 5/2015 | Asterjadhi | H04W 52/0216 370/328 |
| 2016/0044639 | A1* | 2/2016 | Yl | H04L 47/624 370/329 |
| 2016/0315819 | A1 | 10/2016 | Dara et al. | |
| 2016/0315850 | A1 | 10/2016 | Dara et al. | |
| 2016/0315921 | A1* | 10/2016 | Dara | H04L 41/28 |
| 2017/0339072 | A1* | 11/2017 | Pignataro | H04L 45/64 |
| 2018/0285305 | A1* | 10/2018 | Pappu | G06F 13/42 |
| 2020/0145321 | A1 | 5/2020 | Pignataro et al. | |
| 2020/0213242 | A1* | 7/2020 | Zheng | H04L 47/34 |

OTHER PUBLICATIONS

Deering et al., "Internet Protocol, Version 6 (IPv6) Specification," Jul. 2017, RFC 8200, The Internet Society, Reston, VA, USA (forty-two pages).
Carpenter et al., "Transmission and Processing of IPv6 Extension Headers," Dec. 2013, RFC 7045, The Internet Society, Reston, VA, USA (ten pages).
Elkins et al., "IPv6 Performance and Diagnostic Metrics (PDM) Destination Option," Sep. 2017, RFC 8250, The Internet Society, Reston, VA, USA (thirty pages).
Brockners et al., "Requirements for In-situ OAM," Mar. 13, 2017, draft-brockners-inband-oam-requirements-03, The Internet Society, Reston, VA, USA (twenty-four pages).
Brockners et al., "Data Fields for In-situ OAM," Jul. 2, 2017, draft-brockners-inband-oam-data-07, The Internet Society, Reston, VA, USA (twenty-nine pages).
Brockners et al., "Encapsulations for In-situ OAM Data," Jul. 2, 2017, draft-brockners-inband-oam-transport-05, The Internet Society, Reston, VA, USA (thirty pages).
Brockners et al., "Geneve encapsulation for In-situ OAM Data," Jun. 27, 2018, draft-brockners-ippm-ioam-geneve-01, The Internet Society, Reston, VA, USA (ten pages).
Brockners et al., "VXLAN-GPE Encapsulation for In-situ OAM Data," Jun. 27, 2018, draft-brockners-ippm-ioam-vxlan-gpe-01, The Internet Society, Reston, VA, USA (ten pages).
Brockners et al., "Data Fields for In-situ OAM," Oct. 30, 2017, draft-ietf-ippm-ioam-data-01, The Internet Society, Reston, VA, USA (twenty-nine pages).
Brockners et al., "Data Fields for In-situ OAM," Jun. 27, 2018, draft-ietf-ippm-ioam-data-03, The Internet Society, Reston, VA, USA (thirty-five pages).
Song and Zhou, "In-situ OAM Data Type Extension," Apr. 16, 2018, draft-song-ippm-ioam-data-extension-01, The Internet Society, Reston, VA, USA (seven pages).
Bhandari et al., "In-situ OAM IPv6 Options," Jun. 29, 2018, draft-ioametal-ippm-6man-ioam-ipv6-options-00, The Internet Society, Reston, VA, USA (nine pages).
Weis et al., "GRE Encapsulation for In-situ OAM Data," Mar. 3, 2018, draft-weis-ippm-ioam-gre-00, The Internet Society, Reston, VA, USA (nine pages).
Ali et al., "Operations, Administration, and Maintenance (OAM) in Segment Routing Networks with IPv6 Data plane (SRv6)," Jul. 2, 2018, draft-ali-spring-srv6-oam-01.txt, The Internet Society, Reston, VA, USA (twenty-eight pages).
Previdi et al., "IPv6 Segment Routing Header (SRH)," Mar. 13, 2017, draft-ietf-6man-segment-routing-header-06, The Internet Society, Reston, VA, USA (thirty-five pages).
Baker and Bonica, "IPv6 Hop-by-Hop Options Extension Header," Mar. 16, 2016, draft-ietf-6man-hbh-header-handling-03, The Internet Society, Reston, VA, USA (ten pages).
Filsfils et al, "IPv6 Segment Routing Header (SRH)," Jun. 28, 2018, draft-ietf-6man-segment-routing-header-14, The Internet Society, Reston, VA, USA (twenty-nine pages).
"In-band OAM for IPv6," IPv6 Network Management Configuration Guide, Cisco IOS Release 15M&T, Jan. 26, 2018, Cisco Systems, Inc., San Jose, CA (thirty-six pages).
IPv6 Network Management Configuration Guide, Cisco IOS Release 15M&T, Nov. 21, 2012, Cisco Systems, Inc., San Jose, CA (ninety-six pages).
"Encapsulation Techniques: Generic Network Virtualization Encapsulation, VXLAN Generic Protocol Extension, and Network Service Header," White Paper, 2014, Cisco Systems, Inc., San Jose, CA (three pages).
Tom Herbert, "Re: [nvo3] [ippm] [Int-area] encapsulation of IOAM data in various protocols—follow up from WG discussion in London," Apr. 12, 2018, www.mail-archive.com/nvo3@ieff.org/msg05579.html, The Internet Society, Reston, VA, USA (six pages).
Mahalingam et al., "Virtual eXtensible Local Area Network (VXLAN): A Framework for Overlaying Virtualized Layer 2 Networks over Layer 3 Networks," Aug. 2014, RFC 7348, The Internet Society, Reston, VA, USA (twenty-two pages).
Sajassi et al., "BGP MPLS-Based Ethernet VPN," Feb. 2015, RFC 7432, The Internet Society, Reston, VA, USA (fifty-six pages).
J. Touch, "Recommendations on Using Assigned Transport Port Numbers," Aug. 2015, RFC 7605, The Internet Society, Reston, VA, USA (twenty-four pages).
Maino et al., "Generic Protocol Extension for VXLAN," Apr. 30, 2018, draft-ietf-nvo3-vxlan-gpe-06, The Internet Society, Reston, VA, USA (seventeen pages).
"Cisco Data Center Spine-and-Leaf Architecture: Design Overview," White Paper, 2016, Cisco Systems, Inc., San Jose, CA (twenty-seven pages).
Halpern and Pignataro, "Service Function Chaining (SFC) Architecture," Oct. 2015, RFC 7665, The Internet Society, Reston, VA, USA (thirty-two pages).

(56) References Cited

OTHER PUBLICATIONS

Quinn et al., "Network Service Header (NSH)," Jan. 2018, Jan. 2018, RFC 8300, The Internet Society, Reston, VA, USA (forty pages).

Guichard et al., "NSH and Segment Routing Integration for Service Function Chaining (SFC)," Jun. 18, 2018, draft-guichard-sfc-nsh-sr-02, The Internet Society, Reston, VA, USA (fifteen pages).

Kumar et al., "Service Function Simple Offloads," Apr. 2, 2017, draft-ieff-sfc-offloads-00, The Internet Society, Reston, VA, USA (seventeen pages).

"Internet Protocol," Sep. 1981, RFC 791, The Internet Society, Reston, VA, USA (forty-five pages).

Farinacci et al., "Generic Routing Encapsulation (GRE)," Mar. 2000, RFC 2784, The Internet Society, Reston, VA, USA (nine pages).

Brockners et al., "Proof of Transit," Oct. 30, 2016, draft-brockners-proof-of-transit-02, The Internet Society, Reston, VA, USA (twenty-three pages).

Brockners et al., "Proof of Transit," May 7, 2018, draft-brockners-proof-of-transit-05, The Internet Society, Reston, VA, USA (twenty-three pages).

Brockners et al., "Proof of Transit," Oct. 1, 2018, draft-ietf-sfc-proof-of-transit-01, The Internet Society, Reston, VA, USA (twenty-five pages).

* cited by examiner

NETWORK OPERATIONS INCLUDING PROTOCOL PROCESSING OF A PACKET UPDATING AN OPERATIONS DATA FIELD OF A DIFFERENT PROTOCOL

TECHNICAL FIELD

The present disclosure relates generally to packet switching network communications, including, but not limited to, improved operations processing of multiple-protocol packets by packet switching devices in a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with improved network operations including protocol processing of a packet updating an operations data field of a different protocol.

One embodiment includes a method, comprising: receiving a particular multiple-protocol (MP) packet by a particular network node in a network, with the particular MP packet including a plurality of protocol headers, with the plurality with the plurality of protocol headers including a first protocol header associated with a first protocol and a second protocol header associated with a second protocol, and with the second protocol header associated with a second operations data field; protocol processing of the first protocol on the particular MP packet, including updating the second operations data field with particular operations data; and sending, from the particular network node, the particular MP packet including said updated second operations data field with particular operations data.

In one embodiment, the particular network node includes one or more processing elements; memory; and one or more interfaces sending and receiving packets.

In one embodiment, said particular operations data includes an address of the particular network node. In one embodiment, the address is an Internet Protocol version 4 (IPv4) or Internet Protocol version 6 (IPv6) address. In one embodiment, the second operations data field includes an IPv4 or IPv6 address when the particular MP packet is said received by the particular network node. In one embodiment, the first protocol is Ethernet and the first protocol header is Ethernet; and wherein the second protocol header is IPv4 or IPv6. In one embodiment, the first protocol is IPv4 and the first protocol header is an IPv4 header; and wherein the second protocol header is Virtual eXtensible Local Area Network, Generic Protocol Extension (VxLAN-GPE)

In one embodiment, the first protocol is Internet Protocol version 4 (IPv4) and the first protocol header is an IPv4 header; and wherein the second protocol header is Virtual eXtensible Local Area Network, Generic Protocol Extension (VxLAN-GPE). In one embodiment, wherein said particular operations data includes an IPv4 address of the particular network node.

In one embodiment, the first protocol is Ethernet and the first protocol header is Ethernet; and wherein the second protocol header is Internet Protocol version 4 (IPv4). In one embodiment, said particular operations data includes an IPv4 address of the particular network node. In one embodiment, the second operations data field includes an IPv4 or IPv6 address when the particular MP packet is said received by the particular network node.

In one embodiment, the first protocol is Ethernet and the first protocol header is Ethernet; and wherein the second protocol header is Internet Protocol version 6 (IPv6). In one embodiment, said particular operations data includes an IPv6 address of the particular network node.

In one embodiment, the first protocol is Internet Protocol version 4 (IPv4) and the first protocol header is an IPv4 header; and wherein the second protocol header is Network Service Header.

In one embodiment, wherein the first protocol is Internet Protocol version 4 (IPv4) and the first protocol header is an IPv4 header; and wherein the second protocol header is Segment Routing. In one embodiment, the second operations data field including an In-situ Operations, Administration, Maintenance (IOAM) Type-Length-Value (TLV).

In one embodiment, the network comprises an underlay network that includes the particular network node; wherein the first protocol header corresponds to the underlay network; and wherein the second protocol header corresponds to the overlay network. In one embodiment, the MP packet includes a first operations data field associated with the first protocol header; and wherein said protocol processing of the first protocol includes updating the first operations data field.

In one embodiment, the first protocol header is an Internet Protocol version 6 (IPv6) Header, and the second protocol header is an IPv6 extension header. In one embodiment, each of the plurality of protocol headers of the particular MP packet is outside a payload of the particular MP packet.

2. Example Embodiments

Disclosed are, inter alia, methods, apparatus, computer-storage media, mechanisms, and means associated with improved network operations including protocol processing of a packet updating an operations data field of a different protocol. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processing elements, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

As used herein, a "data packet" refers to a standard packet communicating information (such as a customer data packet), with a probe packet (e.g., test packet) not being included in the definition of a data packet.

As used herein, "operations data" refers to operations, administration, maintenance (OAM) and/or provisioning (OAM-P) information (e.g., including operational and telemetry information), such as, but not limited to, in-band OAM data, or more specifically, In-Situ OAM (IOAM) data. In one embodiment, the operations data is raw data, processed data, and/or data resulting from processing of other information.

In one embodiment, the operations data is related to data-plane and/or control-plane processing in the network (e.g., in a portion of, or the entire network). In one embodiment, the operations data is related to communication (including, but not limited to, verifying and/or discovering a path taken and/or performance measurement data or results) and/or other processing of packet(s) in a network. In one embodiment, the operations data is related to process(es), hardware, link(s), and/or other resources of one or more elements in the network (e.g., node(s), router(s), packet switching device(s), network management or other control system(s), host(s), server(s), apparatus, application processor(s), service devices(s), application processor(s), transmission and/or communications equipment). In one embodiment, operations data includes information related to the communication of a packet through a network, other protocol layer processing, and/or same layer processing.

In one embodiment, the operations data encompasses data related to one or more underlay protocols/networks. In one embodiment, the operations data encompasses data related to one or more overlay protocols/networks.

In one embodiment, operations data is added to an operations data field associated with a different protocol than the protocol currently being processed on the packet. The node processing the packet may not be configured to, or may not even be capable of, processing of the protocol of which the operations data field is being updated.

In one embodiment, the operations data field is an IOAM data field. As IOAM data fields may be associated with an extensible number of protocol headers, often the protocol processing of a packet includes the capability of updating an IOAM data field. One embodiment leverages this capability by updating an IOAM data field, but at a position of an IOAM data field associated with a different protocol header.

Figure 1A:
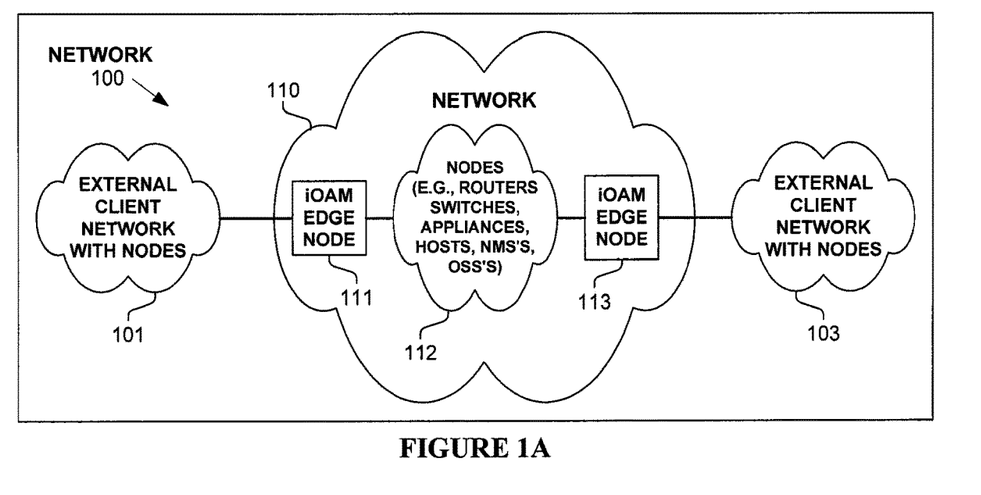
FIG. 1A illustrates a network operating according to one embodiment.

FIG. 1A illustrates a network 100 (e.g., an aggregation of one or more networks of one or more different entities) operating using multiple protocol layers in processing packets (e.g., using overlay and underlay protocols/networks) according to one embodiment. As shown, network 100 includes client networks 101 and 103 (which are the same network in one embodiment) communicatively coupled to a provider network 110. In one embodiment, network 110 uses Segment Routing (SR), Multiprotocol Label Switching (MPLS), tunnels, Ethernet VPN (EVPN), Provider Backbone Bridging EVPN (PBB-EVPN), Virtual eXtensible Local Area Network (VxLAN), Virtual eXtensible Local Area Network Generic Protocol Extension (VxLAN-GPE), Generic Routing Encapsulation, Internet Protocol version 4 and/or 6 (IP), and/or other encapsulating and/or packet forwarding technology.

In one embodiment, provider network 110 includes provider edge nodes 111 and 113, and a network 112 of network nodes, gateways, service functions, hosts (e.g., end nodes), network management, operations support systems, etc. In one embodiment, provider edge nodes 111 and 113 process packets received from networks 101 and 103, which may include encapsulating or otherwise processing these packets into Segment Routing packets such as by adding a SR header (and possibly another IP header) to these packets according to a data plane ascertained Segment Routing policy, and subsequently decapsulating or removing a Segment Routing header (and possibly another IP header) and forwarding the native (e.g., IP) packets into network 101 and 103. In one embodiment, edge nodes 111 and 113 perform ingress and egress processing of packets, including adding and extracting operations data fields and operations data to packets.

Figure 1B:
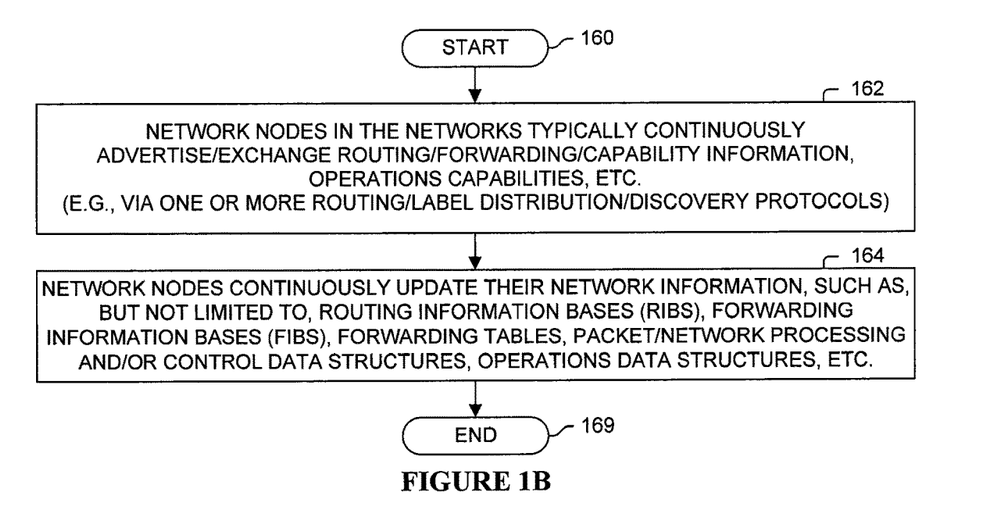
FIG. 1B illustrates a process according to one embodiment.

FIG. 1B illustrates a process according to one embodiment associated with improved network operations including protocol processing of a packet updating an operations data field of a different protocol. Processing begins with process block 160. In process block 162, network nodes in the networks typically continuously advertise/exchange routing, forwarding, capability and information (e.g., including operations capabilities), etc., via one or more routing, label distribution, discovery, signaling and/or other control-plane protocols. In process block 164, the network nodes continuously update their network information, such as, but not limited to, Routing Information Bases (RIBs), Forwarding Information Bases (FIBS), forwarding tables, packet/network processing and/or control data structures, operations data structures, etc. Processing of the flow diagram of FIG. 1B is complete as indicated by process block 169.

Figure 2A:
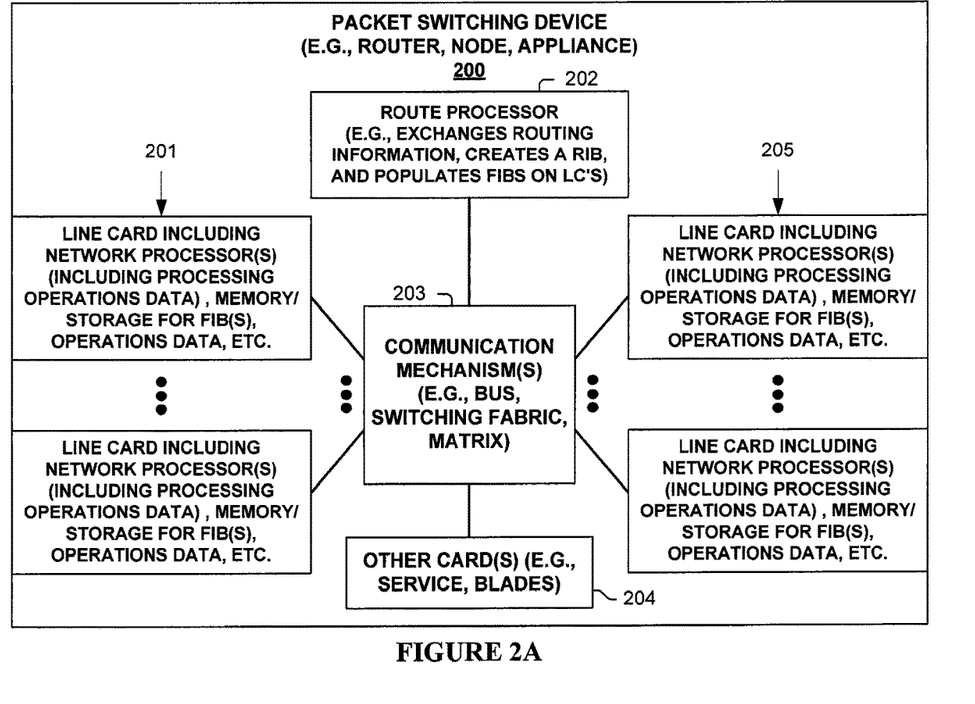
FIG. 2A illustrates a packet switching device according to one embodiment.
Figure 2B:
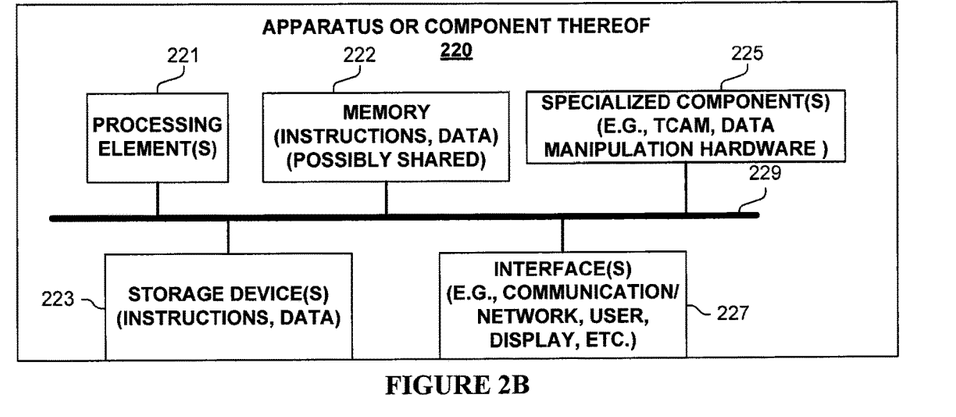
FIG. 2B illustrates an apparatus or component thereof according to one embodiment.

FIGS. 2A-B and their discussion herein provide a description of various network nodes according to one embodiment.

FIG. 2A illustrates one embodiment of a packet switching device 200 (e.g., router, node, switching, appliance, gateway) according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with improved network operations including protocol processing of a packet updating an operations data field of a different protocol. Packet switching device 200 also has a control plane with one or more processing elements (e.g., Route Processor(s)) 202 for managing the control plane and/or control plane processing of packets associated with improved network operations including protocol processing of a packet updating an operations data field of a different protocol. Packet switching device 200 also includes other cards 204 (e.g., service cards, blades) which include processing elements that are used in one embodiment to process (e.g., forward/send, drop, manipulate, change, modify, receive, create, duplicate, perform operations data processing functionality, apply a service according to one or more service functions) packets associated with improved network operations including protocol processing of a packet updating an operations data field of a different protocol, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, operations data processing and storage functions are implemented on line cards 201, 205.

FIG. 2B is a block diagram of an apparatus 220 (e.g., host, router, node, destination, or portion thereof) used in one embodiment associated with improved network operations including protocol processing of a packet updating an operations data field of a different protocol. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup, packet processing (including Segment Routing processing) and/or service function operations; associative memory; binary and/or ternary content-addressable memory; Application Specific Integrated Circuit(s), cryptographic hash hardware, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
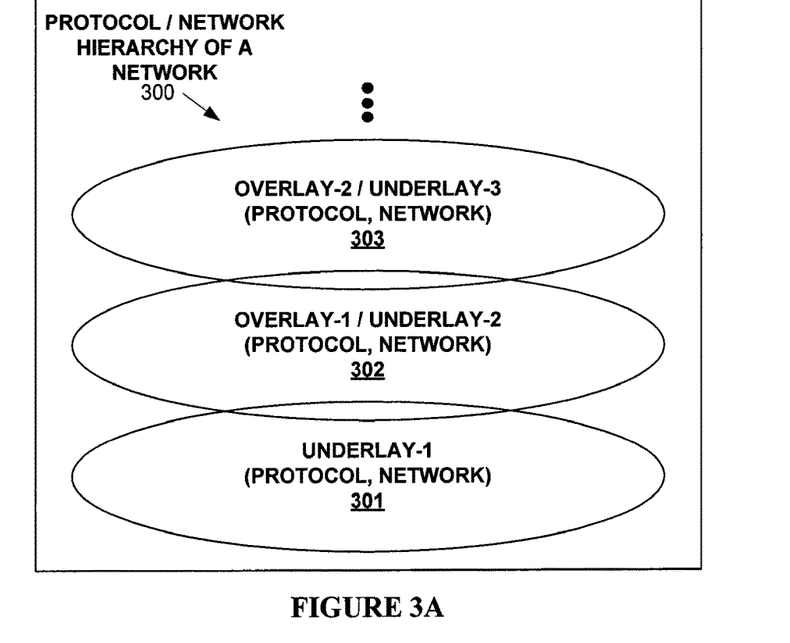
FIG. 3A illustrates a protocol/network hierarchy according to one embodiment.

FIG. 3A illustrates a hierarchical nature of a network 300 operating according to one embodiment. This hierarchal nature can be viewed in terms of the related entities of:

overlay and underlay networks; and overlay and underlay protocol layers represented in headers included in a packet.

Overlay and underlay are relative terms. In one embodiment, a first (underlay) protocol/network (301) is viewed in relation to a second (overlay) protocol/network (302). One embodiment additionally includes a third (overlay) protocol/network (303) such that the second protocol/network (302) is an underlay to the third protocol/network (303), while remaining to be an overlay to the first protocol/network (301).

One embodiment includes any protocol/network associated with the Open Standards Interconnection (OSI) model, and may include multiple protocols/networks from a same Layer of the OSI model.

One embodiment is used in conjunction with, but not limited to, a physical transport network (e.g., optical switches and devices, facilities), a networking transport network (e.g., switches, routers), and a service chaining network 330 (e.g., service nodes, which as shown includes also network management and operations support systems in one embodiment). One embodiment is used in conjunction with, but not limited to, multiple protocols associated with same and/or different OSI layers.

In one embodiment, network 300 uses Segment Routing (SR), Multiprotocol Label Switching (MPLS), various tunneling protocols, Ethernet VPN (EVPN), Provider Backbone Bridging EVPN (PBB-EVPN), Virtual eXtensible Local Area Network(VxLAN), Virtual eXtensible Local Area Network Generic Protocol Extension (VxLAN-GPE), Generic Routing Encapsulation, Internet Protocol version 4 and/or 6 (IP), Ethernet and/or other encapsulating and/or forwarding protocols.

Correspondingly, one embodiment acquires correlated operations data by adding operations data to operations data fields of different protocol headers of a multiple-protocol (MP) packet as it traverses a network, including the protocol processing of one protocol updating an operations data field associated with another protocol at various points during this network traversal.

Figure 3B:
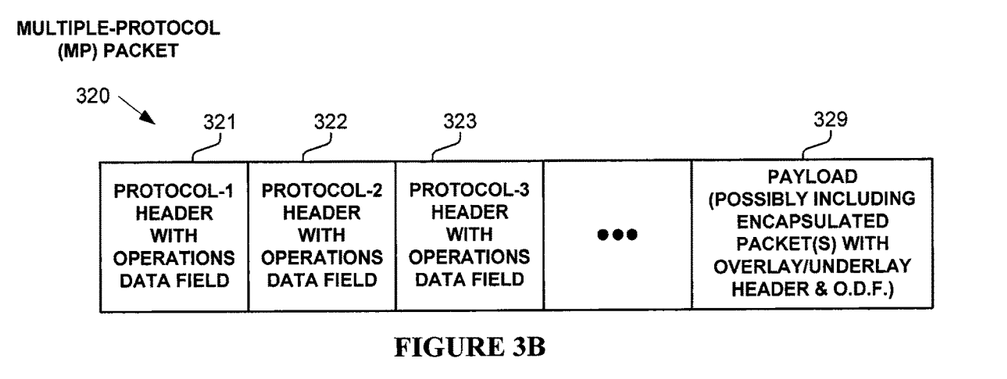
FIG. 3B illustrates a multiple-protocol (MP) packet according to one embodiment.

FIG. 3B illustrates a multiple-protocol (MP) packet 320 according to one embodiment. As shown, MP packet 320 includes multiple headers 321-323, each with an operations data field for receiving operations data added by corresponding protocol layer processing. MP packet 320 also includes payload 329, which may include an encapsulated packet that has one or more headers. In one embodiment, operations data is only added and cohered from two or more headers 321-323 of MP packet 320 that are outside payload 329. In one embodiment, operations data is added to one or more headers 321-323 of MP packet 320 as well as one or more headers of an encapsulated packet inside payload 329.

Figure 4A:
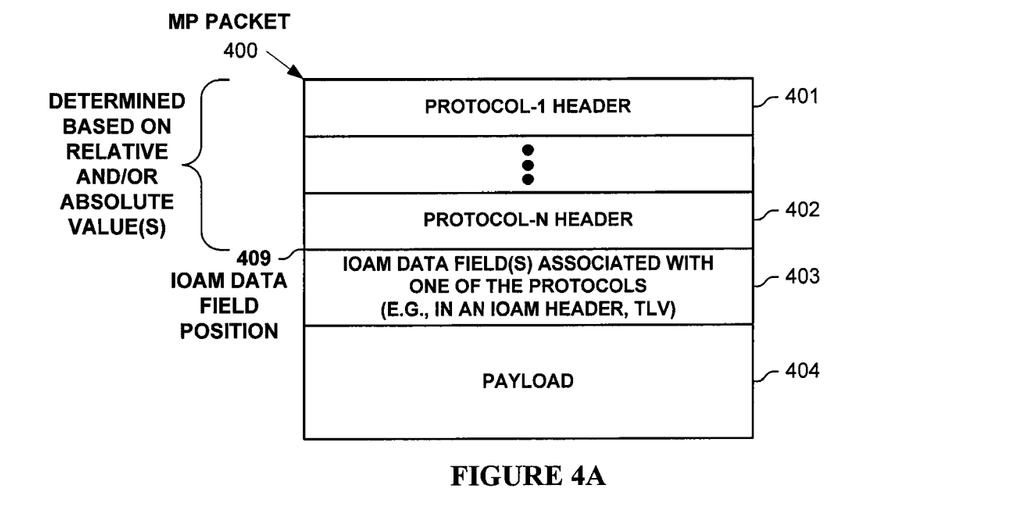
FIG. 4A illustrates an MP packet according to one embodiment.

FIG. 4A illustrates a MP packet 400 according to one embodiment. As shown, MP packet 400 includes two or more headers (401-402), one or more operations data fields 403, and a payload 404. Each of two or more headers (401-402) is associated with a different protocol. IOAM data field 403 is associated with one of the protocol headers. In one embodiment, IOAM data field 403 is an IOAM header. In one embodiment, IOAM data field 403 is an IOAM Type-Length-Value (TLV).

A problem with a prior approach is that the operations data associated with each header of a packet was maintained independently within the packet. In other words, the protocol processing of one protocol header only updates an operations data field associated with that protocol header. Thus, a packet did not directly indicate an ordering of the operations data of various protocols (and/or underlay and overlay protocols/networks). To achieve improved operations processing of multiple-protocol packets by packet switching devices in a network, the protocol processing of one protocol updates an operations data field associated with another protocol. In one embodiment, the updating protocol processing does not process the second protocol (and the node might not even be capable of such processing). Rather, the operations data field (e.g., IOAM operations data field associated with a different protocol) is updated.

In one embodiment, the operations data field is an IOAM data field. As IOAM data fields may be associated with an extensible number of protocol headers, often the protocol processing of a packet includes the capability of updating an IOAM data field. One embodiment leverages this capability by updating an IOAM data field, but at a position of an IOAM data field associated with a different protocol header.

As shown in FIG. 4A, one embodiment uses an identified position 409 of an IOAM data field 403 associated with a second protocol header 402 when protocol processing of the packet according to a different protocol its associated header 401. This position 409 may be a predetermined fixed offset from the start of packet or other packet position (e.g., start of the packet header currently being processed). In one embodiment, the position 409 of the IOAM data field 403 being updated is identified based on one or more fixed values and/or one or more relative values (e.g., a length of a header).

Figure 4B:
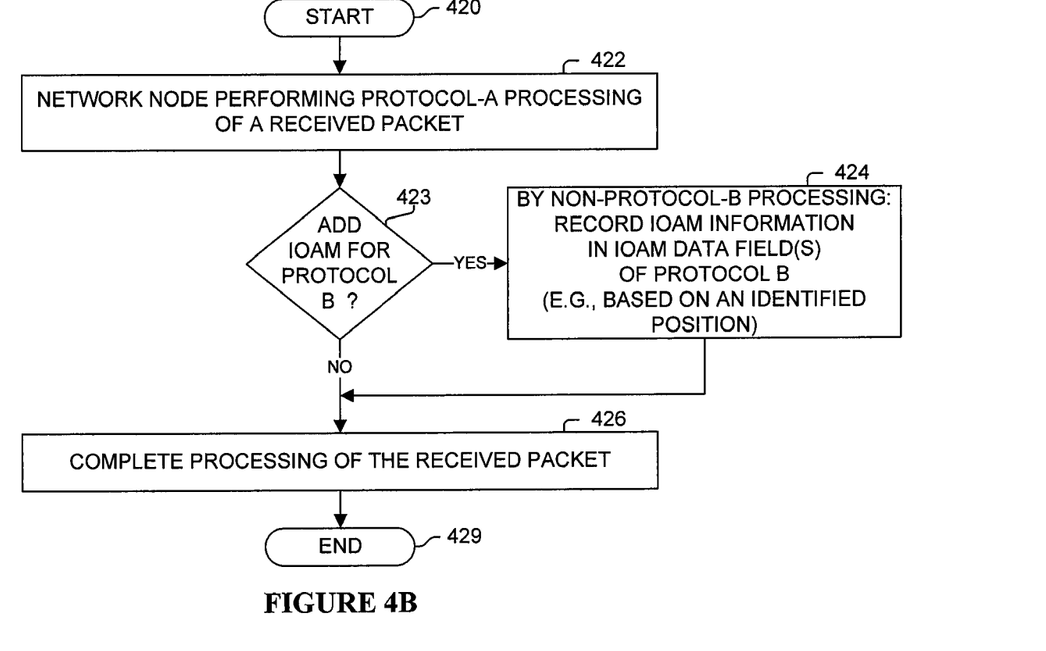
FIG. 4B illustrates a process according to one embodiment.

FIG. 4B illustrates a process according to one embodiment. Processing begins with process block 420. In process block 422, the network performs protocol "A" processing of the received packet. In one embodiment, this processing includes updating an operations data field associated with a protocol "A" header.

As determined in process block 423, if the operations data field associated with a header of a different protocol "B," then processing proceeds to process block 424; otherwise, processing proceeds directly to process block 426.

In process block 424, processing of the packet (e.g., by protocol "A" processing but not protocol "B" processing), updates the operations data field associated with a header of protocol "B," typically after identifying the protocol "B" operations data field using relative and/or absolute offset value(s). Processing proceeds to process block 426.

In process block 426, processing of the received packet is completed. Processing of the flow diagram of FIG. 4B is complete as indicated by process block 429.

Each of FIGS. 5A-D is intended to illustrate one embodiment, of an expansive number of embodiments, using other protocol processing of protocol headers.

Figure 5A:
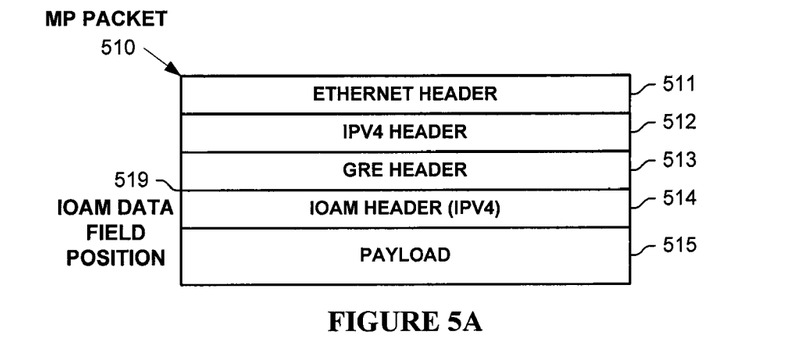
FIG. 5A illustrates an MP packet according to one embodiment.

FIG. 5A illustrates MP packet 510 according to one embodiment. As show, MP packet 510 includes Ethernet header 511, IPv4 header 512, GRE header 513, IOAM header 514 associated with IPv4 header 512 (and IPv4 protocol processing), and payload 515. In one embodiment, operations data is updated in IOAM header 514 (e.g., an operations data field possibly identified by position 519) during Ethernet protocol processing.

Figure 5B:
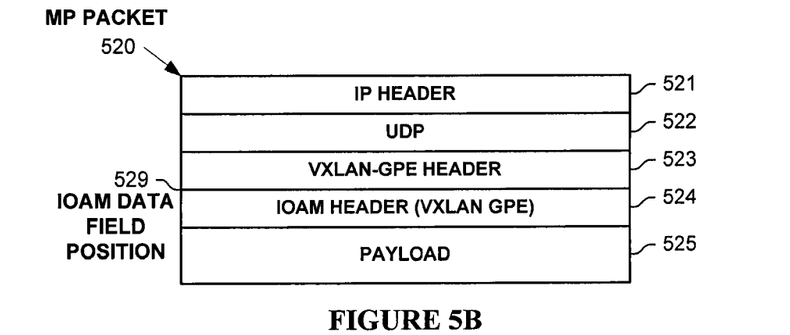
FIG. 5B illustrates an MP packet according to one embodiment.

FIG. 5B illustrates MP packet 520 according to one embodiment. As show, MP packet 520 includes IP header 521, UDP header 522, VxLAN-GPE header 523, IOAM header 524 associated with VxLAN-GPE header 523, and payload 525. In one embodiment, operations data is updated in IOAM header 524 (e.g., an operations data field possibly identified by position 529) during IP protocol processing.

Figure 5C:
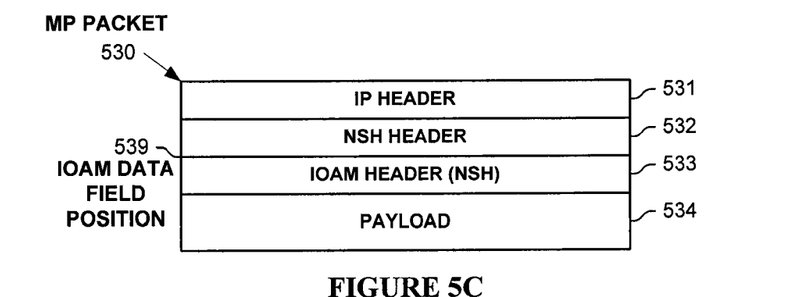
FIG. 5C illustrates an MP packet according to one embodiment.

FIG. 5C illustrates MP packet 530 according to one embodiment. As show, MP packet 530 includes IP header 531, Network Service Header (NSH) header 532, IOAM header 533 associated with NSH 532, and payload 534. In one embodiment, operations data is updated in IOAM header 533 (e.g., an operations data field possibly identified by position 539) during IP protocol processing.

Figure 5D:
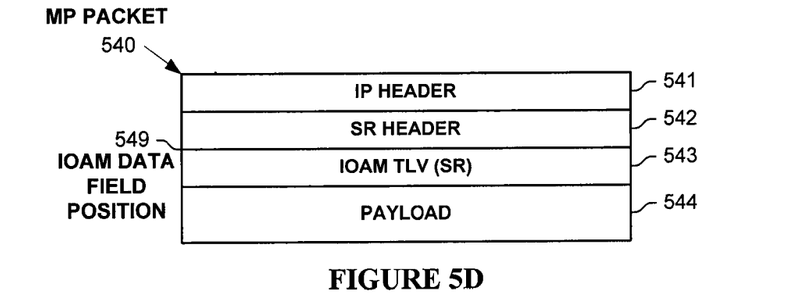
FIG. 5D illustrates an MP packet according to one embodiment.

FIG. 5D illustrates MP packet 540 according to one embodiment. As show, MP packet 540 includes IP header 541, SR header (SRH) 542, IOAM TLV 543 associated with SRH 542, and payload 544. In one embodiment, operations data is updated in IOAM TLV 543 (e.g., an operations data field possibly identified by position 549) during IP protocol processing.

Figure 6:
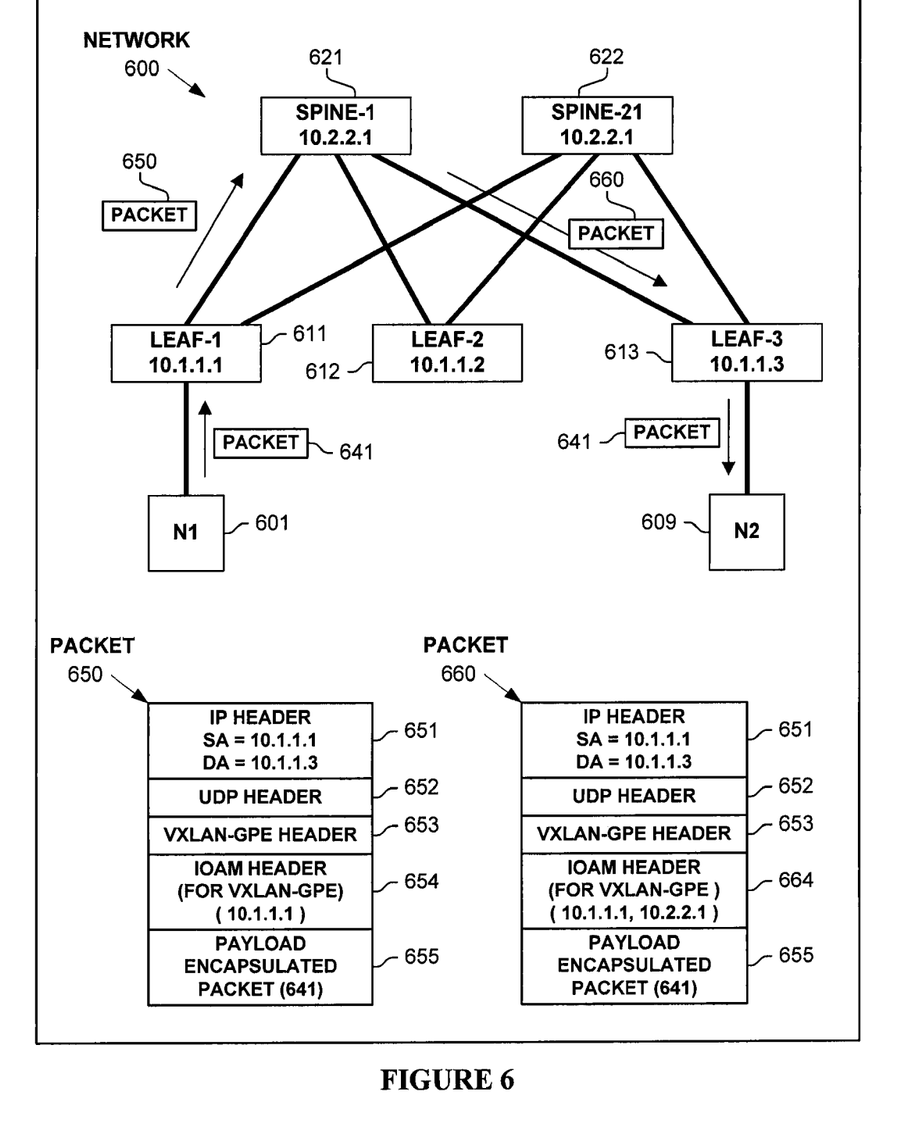
FIG. 6 illustrates a network operating according to one embodiment.

FIG. 6 illustrates a network 600 operating according to one embodiment. As shown, network 600 includes a data center topology (possibly with data center interconnect nodes, not shown) that includes leaf nodes 611-613 and spine nodes 621-622. Leaf node-1 (611) is coupled to node N1 (601); and Leaf node-1 (613) is coupled to node N2 (609). Leaf node 611-613 use VxLAN tunnels to communicate amongst each other through spine nodes 621-622.

In one embodiment, a packet 641 is sent from node N1 (601) to node N2 (609) via leaf-1 (611 and with an IP address of 10.1.1.1), spine-1 (621 and with an IP address of 10.2.2.1), to leaf-1 (613 and with an IP address of 10.1.1.3).

In more detail, leaf-1 (611) receives and processes packet 641 resulting in encapsulating packet 650 sent to spine-1 (621). In one embodiment and as shown at the bottom of FIG. 6, packet 650 includes outer IP header 651, UDP header 652, VxLAN-GPE header 653, IOAM header 654, and payload 655 that includes packet 641. IOAM header 654 (e.g., a node data list therein)) is updated with the IP address of leaf-1 (611). Packet 650 is sent to spine-1 (621).

Spine-1 (621) receives and processes packet 650 resulting in packet 660 sent to leaf-3 (613). Spine-1 (621) performs IP processing that includes updating IOAM header 664 (e.g., a node data list therein) is updated by appending the IP address of spine-1 (621) to operations data already in IOAM header 664. Spine-1 (621) does not perform VxLAN processing nor processing of VxLAN-GPE header 653. Rather, protocol processing of the first protocol (e.g., IP) on particular MP packet 650 resulting in MP packet 660 includes updating operations data field 664 associated with a second protocol header (e.g., VxLAN-GPE header 653).

Packet 660 is received and processed by leaf-3 (613), resulting in packet 641 being sent to node-2 (609). This processing includes leaf-3 (613) extracting the operations data from IOAM header 664 (e.g., an operations data field), and decapsulating packet 641. This obtained operations data is used to verify the path of transit (PoT). In one embodiment, the operations data added to IOAM header 664 in network 600 includes timestamps and other processing indicia that is used to determine performance, adjust load-balancing in network 660, and performing other reactive network operations.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
receiving a particular multiple-protocol (MP) packet by a particular network node in a network, with the particular MP packet including a plurality of protocol headers, with the plurality of protocol headers including a first protocol header associated with a first protocol and a second protocol header associated with a second protocol, and with the second protocol header associated with a second operations data field;
protocol processing of the first protocol on the particular MP packet, including updating the second operations data field with particular operations data; and
sending, from the particular network node, the particular MP packet including said updated second operations data field with said particular operations data;
wherein said protocol processing of the first protocol does not include protocol processing of the second protocol.

2. The method of claim 1, wherein said particular operations data includes an address of the particular network node.

3. The method of claim 2, wherein the address is an Internet Protocol version 4 (IPv4) or Internet Protocol version 6 (IPv6) address.

4. The method of claim 3, wherein the second operations data field includes an IPv4 or IPv6 address when the particular MP packet is said received by the particular network node.

5. The method of claim 4, wherein the first protocol is Ethernet and the first protocol header is Ethernet; and wherein the second protocol header is IPv4 or IPv6.

6. The method of claim 4, wherein the first protocol is IPv4 and the first protocol header is an IPv4 header; and wherein the second protocol header is Virtual eXtensible Local Area Network, Generic Protocol Extension (VxLAN-GPE).

7. The method of claim 1, wherein the first protocol is Internet Protocol version 4 (IPv4) and the first protocol header is an IPv4 header; and wherein the second protocol header is Virtual eXtensible Local Area Network, Generic Protocol Extension (VxLAN-GPE).

8. The method of claim 7, wherein said particular operations data includes an IPv4 address of the particular network node.

9. The method of claim 1, wherein the first protocol is Ethernet and the first protocol header is Ethernet; and wherein the second protocol header is Internet Protocol version 4 (IPv4).

10. The method of claim 9, wherein said particular operations data includes an IPv4 address of the particular network node.

11. The method of claim 10, wherein the second operations data field includes an IPv4 or IPv6 address when the particular MP packet is said received by the particular network node.

12. The method of claim 1, wherein the first protocol is Ethernet and the first protocol header is Ethernet; and wherein the second protocol header is Internet Protocol version 6 (IPv6).

13. The method of claim 12, wherein said particular operations data includes an IPv6 address of the particular network node.

14. The method of claim 1, wherein the first protocol is Internet Protocol version 4 (IPv4) and the first protocol header is an IPv4 header; and wherein the second protocol header is Network Service Header.

15. The method of claim 1, wherein the first protocol is Internet Protocol version 4 (IPv4) and the first protocol header is an IPv4 header; and wherein the second protocol header is Segment Routing.

16. The method of claim 15, wherein the second operations data field including an In-situ Operations, Administration, Maintenance (IOAM) Type-Length-Value (TLV).

17. The method of claim 1, wherein the network comprises an underlay network that includes the particular network node; wherein the first protocol header corresponds to the underlay network; and wherein the second protocol header corresponds to an overlay network.

18. The method of claim 17, wherein the MP packet includes a first operations data field associated with the first protocol header; and wherein said protocol processing of the first protocol includes updating the first operations data field.

19. The method of claim 1, wherein the first protocol header is an Internet Protocol version 6 (IPv6) Header, and the second protocol header is an IPv6 extension header.

20. The method of claim 1, wherein each of the plurality of protocol headers of the particular MP packet is outside a payload of the particular MP packet.

21. The method of claim 1, wherein the particular network node does not perform protocol processing of the second protocol on the particular MP packet.

22. A particular network node in a network, comprising:
one or more processing elements;
memory;
one or more interfaces sending and receiving packets; and
wherein the particular network node performs operations including:
receiving a particular multiple-protocol (MP) packet, with the particular MP packet including a plurality of protocol headers, with the plurality of protocol headers including a first protocol header associated with a first protocol and a second protocol header associated with a second protocol, and with the second protocol header associated with a second operations data field;
protocol processing of the first protocol on the particular MP packet, including updating the second operations data field with particular operations data; and
sending, from the particular network node, the particular MP packet including said updated second operations data field with said particular operations data,
wherein said protocol processing of the first protocol does not include protocol processing of the second protocol.

23. The particular network node of claim 22, wherein the particular network node does not perform protocol processing of the second protocol on the particular MP packet.

* * * * *